May 12, 1970
A. A. JONES ET AL
3,511,056
TRASH DISPOSAL SYSTEM AND APPARATUS
Filed Feb. 9, 1968
2 Sheets-Sheet 1
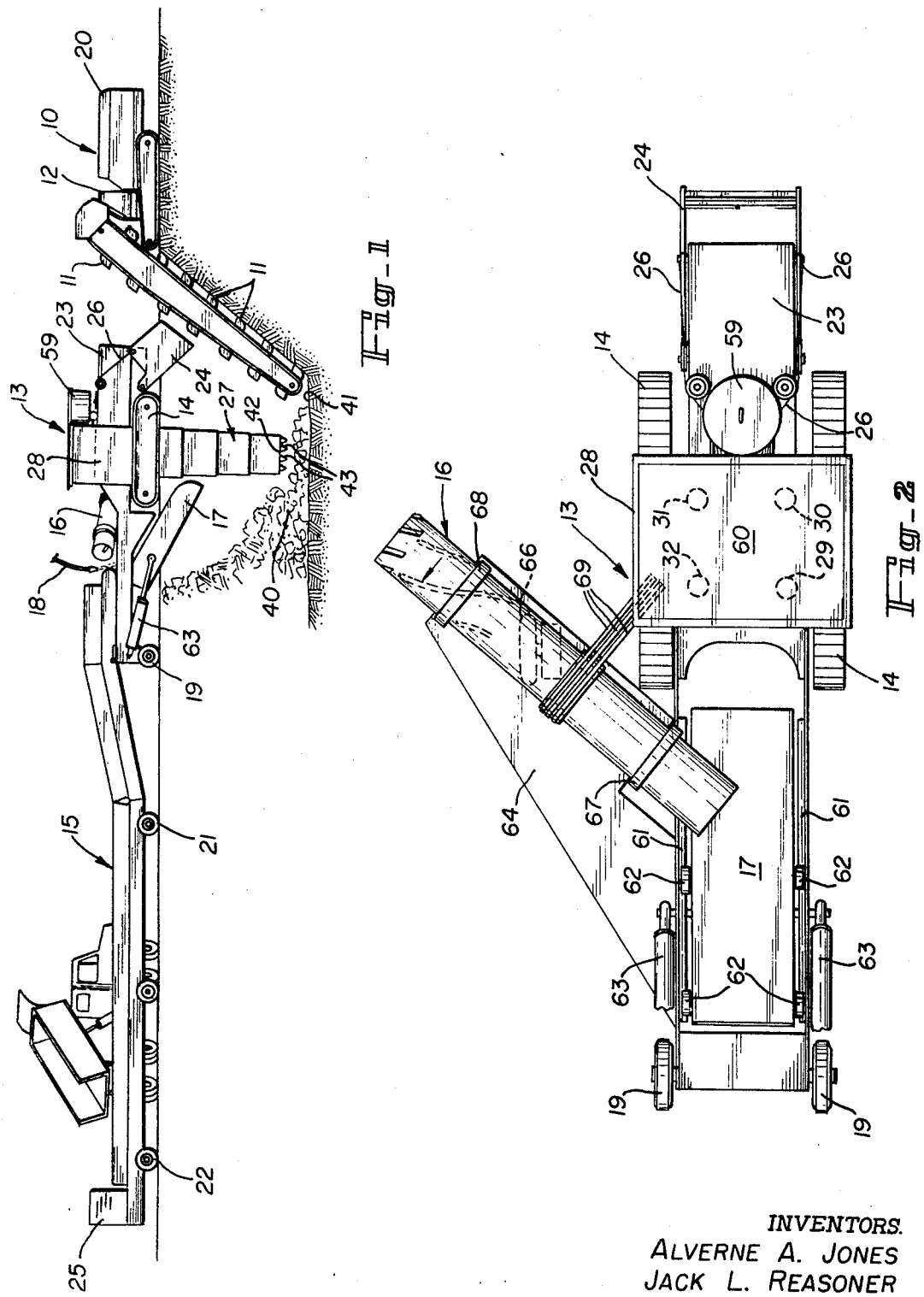
INVENTORS.
ALVERNE A. JONES
JACK L. REASONER
BY
*Brzessinger*
ATTORNEY

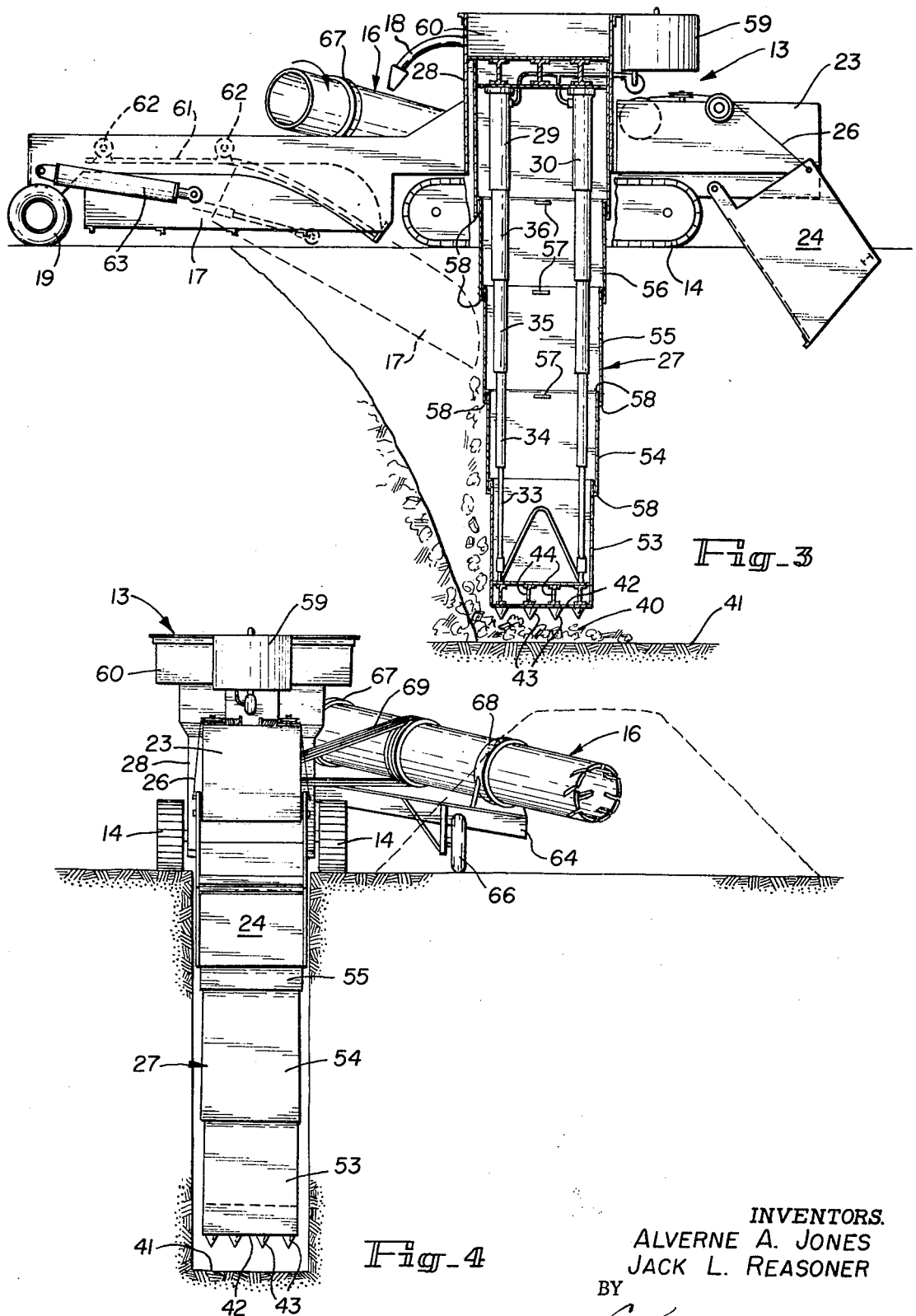

United States Patent Office 3,511,056
Patented May 12, 1970

3,511,056
TRASH DISPOSAL SYSTEM AND APPARATUS
Alverne A. Jones, 10670 W. 47th Place, and Jack L. Reasoner, 6119 Otis St., both of Wheatridge, Colo. 80033
Filed Feb. 9, 1968, Ser. No. 704,484
Int. Cl. E02d *15/00*
U.S. Cl. 61—35     12 Claims

ABSTRACT OF THE DISCLOSURE

A method for the disposal of trash and mechanisms therefor, the method being inclusive of the steps of excavating soil at a disposal site to provide a trench or depression extending below the initial ground surface, elevating the removed soil to a place above the initial ground surface with a portion of said soil being intermixed with trash before the trash and soil intermixture is redeposited in layers in the dug depression, compacting the intermixed trash and soil materials in said depression through use of apparatus supported at least at the initial ground level elevation and having compactor elements for extension therebelow. The redeposition and compaction operations are continued until the dug depression is at least refilled to an elevation corresponding to the initial ground level, and thereafter the remainder of the removed soil is redistributed to provide a cover for the intermixed deposit and to establish a new ground elevation higher than the initial ground level. Water may be added to the intermixture to improve the compaction characteristics.

In an embodiment of the invention mechanisms inclusive of trench diggers and soil elevating and conveyor apparatus are utilized together with a mobile, platform-mounted compactor unit which provides downwardly extendable ram components for the compaction of intermixed materials in the dug depression. The compactor elements are retractable to facilitate the overground movement of said compactor whereby all units of the utilized apparatus may be moved to new operational sites as required.

BACKGROUND OF THE INVENTION

At the present time when the problems of trash disposal have been increased by the urbanization of people, the effectiveness, desirability and convenience of established trash disposal procedures have been decreased. Conventional land fill operations are being hampered by a rapidly diminishing supply of suitable disposal sites. At the same time authorities and individuals have become convinced that current disposal operations are unsatisfactory by reason of poor sanitation practices and air pollution problems. It is also recognized that prior disposal operations have not always been carried on in a manner that contributes to the beneficial reuse of abandoned dump sites. In recognition of the overall problems presented and in an effort to increase the availability of trash disposal sites, the present inventors provide a systems approach to trash disposal problems which will not only increase the total of land areas that are suitable for trash disposal but which further recognizes the problems of sanitation, pollution and land reuse in a manner that will assure the acceptability of this new trash disposal system.

SUMMARY OF THE INVENTION

Briefly stated, the present invention presents a method for the disposal of trash which presents an improved solution for trash disposal problems. In the practice of the method a trench or depression is dug in the earth surface to remove soil products from the trench. A portion of the soil elevated from the trench is recombined with trash materials that are to be disposed of. The trash and soil intermixture is deposited in the dug trench and is substantially compacted in place in layers at raising levels until the dug trench is substantially filled with the compacted intermixture. Thereafter the remainder of elevated soil can be redistributed above the initial ground level and over materials compacted in the trench or over the top of additional trash materials deposited above the initial ground level to provide a cover for all the deposited and compacted trash materials. Water can be added to the intermixed materials as they are deposited to improve the compaction characteristics of the deposit and further to improve sanitation conditions at the site. Since the intermixture of dug soil and the application of compaction forces can provide a deposit that has ground support characteristics equal to or better than the initial load supporting characteristics of the naturally emplaced soils at the site, the site can be returned to beneficial surface uses at an early date. For some sites the increased soil support characteristics will be highly beneficial. For others the increased elevation attained can improve the value of the land as a building or recreational site.

In the practice of the invention various types of earth excavating and handling apparatus can be utilized. A compactor unit having downwardly extendable force exerting elements is ilustrated for compacting deposited materials at the bottom or at successive raised elevations in the dug trench. Such compactor unit is used cooperatively together with trench digging apparatus and conveyor means for moving removed soil or trash deposits to desired positions of use.

BRIEF DESCRIPTION OF THE DRAWINGS

Apparatus useful in connection with the practice of the invention or separately of patentable interest is shown in the acompanying drawings, in which FIG. 1 is a side elevational in partial section showing the overall systems arrangement, FIG. 2 is a top view of the compactor unit shown in FIGS. 3 and 4, FIG. 3 is a side elevation with elements shown in alternate position to illustrate operation of the device, and FIG. 4 is an end elevation showing additional features of the compactor unit and its associated elevating conveyor.

DESCRIPTION OF THE PREFERRED EMBODIMENT

FIG. 1 presents an overall systems approach to the problem of trash disposal and a solution therefor made in accord with this invention. In the practice of the invention a bucket ladder trencher 10 or other excavation machine digs a trench that may be of substantial depth. On trencher 10 the buckets 11 are moved to dig and elevate dirt that is then deposited aboveground in a windrow alongside the trench by a cross feed conveyor 12. The trencher 10 is followed by a trash emplacing unit 13 which is mounted on a track propelled chassis 14. This unit receives trash from a conveyor component 15 and distributes the trash into the ditch dug by the ditcher to be compacted by the compactors 27 of trash emplacing unit 13. A portion of the dirt and soil dug by the ditcher is retrieved from the windrow and is further elevated by an elevating mechanism 16 to be dumped into a receiving hopper 17 of unit 13 where it is intermixed with the trash from the conveyor 15 to assure adequate compaction of the materials redeposited into the dug trench and further to maintain improved sanitation conditions during operations. Water may likewise by delivered into the trench by the supply hose 18 and nozzle to further improve the compaction and sanitation characteristics of the trash disposal system.

While windrow and re-elevating steps are illustrated in the present embodiment, a conveyor system can be used to interconnect the cross feed conveyor 12 of the ditcher and the receiving hopper 17 of the compaction unit 13. Such a conveyor would be used in place of the drum conveyor 16. With either conveyor it would be possible to redeposit all or only a portion of the dug soil in an intermixture with the deposited trash. Usually it would be desirable to have some soil left over for use as a top layer that would be placed and spread over the deposited and compacted trash and dirt intermixture. Where a portion of the removed soil is retained to provide a cover layer, the land can be more readily returned to recreational or commercial uses. Where top soil is segregated and later used for a top cover, the land could be readily returned to farming or forest uses. While a ground level windrow deposit of dug soil is illustrated, a conveyor system or the conveyors illustrated can be used to deposit the dug soil rearwardly and at an elevated position on top of already compacted trash deposits at the original ground elevation or higher.

The overall system shown incorporates features that would make it possible to handle a large quantity of trash expeditiously and economically. Various types of wheel and ladder type ditchers are available. The other components of the trash disposal system can be cooperatively sized to handle the amount of trash that it takes to fill the ditch that is dug by the particular ditcher used. The most economical use of the system would use larger sized ditchers. For a ditcher capable of digging a five foot wide ditch that was up to twenty feet in depth, a trash conveyor would be provided that was approximately sixty feet long so that up to five dump or trash disposal trucks could be unloaded at a time. Components of the compactor unit 13 can likewise be cooperatively sized to handle the emplacement and compaction of trash delivered by such a conveyor receiving system.

Where all units were of a proper design and size, the ditcher, compactor and conveyor components could be moved progressively along a ditch as a unit. When used unitarily, the separate engines 20, 23 and 25 provided for the ditcher, compactor and conveyor components, respectively, could be replaced by a single power unit. Similarly, the functions of the engines 23 and 25 could be handled by a single power unit quite efficiently.

On embodiments of the invention in which the compaction operations are hydraulically actuated, the unit hydraulic system could provide a beneficial track driving and steering system for the support chassis 14. Similarly, hydraulic power could be used to run the trash conveyor 15 and to power rotation of the support wheels 19, 21 and 22 thereof. Where a long conveyor is required and where there may be substantial changes in the elevation or even alignment of collection and delivery points, a capability to provide individual power at each of the support wheels would be advantageous.

When the illustrated components are all used together in a series arrangement as illustrated, other benefits are possible. When the system is to be used in locations where the soils may not be free standing, a ditch wall shield 24 can be provided on the compactor unit 13 that will extend down into the dug trench to be engaged against the side walls of the trench. This same shield 24 will then provide a crumber for the ditcher 10 that is useful to confine separated dirt and to direct the dirt into the elevating buckets. When the compactor is to be moved along level terrain, the shield-crumber 24 can be retracted by the cable system 26. Similarly, the compactor extension 27 and the receiving hopper 17 can be retracted so the entire compactor unit 13 may be moved along normal terrain from one work station to another.

The construction of the compactor unit 13 is shown in greater detail in FIGS. 2, 3 and 4. Here it will be noted that the track and chassis 14 provide support for a frame 28 which extends substantially above the tracks 14. Positioned inboard with respect to the tracks and supported by the frame 28 are a plurality of telescoping hydraulic rams or cylinders 29, 30, 31, 32. Each of the rams has a plurality of telescoping shafts, such as the elements 33–36, as shown in FIG. 2. The use of telescoping cylinders makes it possible for hydraulic forces to be exerted a substantial distance downwardly and between the tracks as necessary to compact trash 40 deposited at the bottom 41 of a dug trench. All of the cylinder units 29–32 are connected to a bottom plate 42, and the plate may be provided with penetrating prongs or feet 43, as shown. A bed frame 44 supports the bottom plate 42 to efficiently transmit the forces exerted by the hydraulic cylinders to the plate 42 and prong feet 43.

In order to protect the cylinder walls as they are exposed, a box shield construction is provided to surround these units. The shield box sections 53–56 are themselves adapted to telescope one within the other as the cylinder shafts are extended and retracted. Inner stops 57 are provided on the inner surface of the box sections to be engaged by the next lower telescoping shield. Similarly, interlocks 58 are provided at the lower lips of each of the box sections to prevent an inner shield from falling past the lower limit of the next adjacent shield.

For any ditch size the forces exerted by the multiple cylinders 29–32 will be substantial to obtain adequate compaction of the trash and soil mixture as necessary to satisfy building code restrictions for structures that may later be erected on the site. The compaction force required could be enough to disengage the tracks 14 from the supporting earth at the side of the ditch. For this reason the compactor unit 13 will be built of heavy components not only to provide a durable unit but also to provide adequate weight. The weight, however, should not be increased to a point where the tracks 14 will not support the vehicle adequately as it is being moved from one site to another. A hydraulic reservoir 59 can be provided with a substantial oil capacity to increase the weight of the unit. Similarly, a ballast tank 60 can be used. The ballast tank 60 can be filled with water or other liquids to increase the operative weight of the unit. The weight represented by the liquid in the ballast tank can, of course, be off-loaded when the unit 13 is being moved. The ballast tank or multiple tanks can be of larger size or different placement to obtain a desirable working weight. The hose 18 for adding water to the fill materials can be interconnected to the ballast tank as shown in FIG. 3, or such hose may be connected directly to a separate source of water. The water stream from the hose 18 can be pressurized to substantially wash the receiving hopper 17 or other trash handling components of the compactor unit 13. The sanitation characteristics of the unit as well as the soil compaction characteristics derived can, accordingly, be improved through the provision of water supply components.

The trash receptacle for the compactor unit 13 can actually be provided as an attachment or as a separate component. Where it is attached as illustrated, the weight of this component is also added to the overall weight of the compactor 13.

The receiving hopper 17 of the trash receiver and its rollers 62 are mounted on a guide rail 61 to be moved reciprocally from a dump position to a retracted carry position. An actuating cylinder 63 can be used to move it to the position desired.

A conveyor system for elevating a portion of the windrow dirt is mounted on an outrigger frame 64 that may be further supported by a wheel 66. The external tube of the conveyor 16 is adapted to rotate in inboard and outboard ring bearings 67 and 68 which are themselves mounted on frame elements. For the embodiments shown a V belt drive 69 is used. The power for this drive can be provided by hydraulics or by a separate clutch operated drive system connected to the engine 23. In addition to elevating a portion of the removed soil for deposit in the receiving hopper 17, the conveyor 16 or similar conveyor mechanisms can be used to elevate dirt received directly from the cross feed conveyor 12 of the ditcher 10. Movement of the soil products extracted from the ditch to an elevation above the initial ground level would make it possible to continue the trash deposit to an elevation higher than the original ground level while still retaining a quantity of dirt in convenient position to provide a top cover over the compacted and elevated deposit. This capability for substantially building up the elevations of a trash disposal site can be of special advantage for areas that are in a flood plane or that are for other reason too low for optimum land use development.

In connection with the placement of deposits above an initial ground level, it should be noted that the combined force exerted by the hydraulic cylinders 29–32 could be adequate to raise the entire compactor unit 13 above the supporting ground. If the track laying chassis 14 was raised in this manner, planks, dirt or other mechanical or developed ramps could be established beneath the track chassis 14 so that trash deposit and compaction operations could be continued at an elevation above the original ground support level.

While one apparatus embodiment of the invention has been shown and described, it should be apparent that various modifications and changes can be made in the construction of the apparatus or in connection with practice of the method of this invention.

We claim:

1. A method for the disposal of trash comprising the steps of excavating soil at a disposal site to provide a trench or depression extending below the initial ground surface, elevating the removed soil above the initial ground surface, intermixing a portion of said soil with trash as the trash is deposited in layers in the dug depression, compacting the intermixed trash and soil materials in said depression utilizing a compactor supported at the initial ground level elevation or higher and having compactor elements extending therebelow into the dug depression, continuing the refill and compaction operations until the depression is filled to a level corresponding to the initial ground level, and thereafter redistributing more of the removed soil to provide a cover for the intermixed trash and soil deposit and to establish a new ground elevation higher than the initial ground level.

2. The method as set forth in claim 1 and further comprising the step of continuing the intermixed trash and soil refill and compaction operations to attain a level higher than the initial ground level before distributing more soil to provide the required cover.

3. The method as set forth in claim 1 and further comprising the step of adding water to the intermixed deposit of trash and soil to improve the compaction and/or sanitation characteristics of the operations.

4. The method as set forth in claim 2 wherein at least a portion of the soil initially removed from the dug depression is raised to an elevation above the final level of intermixed and compacted trash and soil for convenient useage to provide a top cover.

5. Apparatus for the disposal of trash comprising an excavating component for the removal of soil at a trash disposal site to provide a trench or excavation extending below the initial ground level, a compactor component having a frame support, a plurality of rotatable support members on said frame disposed to facilitate the movement thereof above the supporting ground, said rotatable support members being further positioned to maintain the frame support of such compactor component at the initial ground level or above as the compactor is positioned adjacent the said trash disposal excavation, an extendable force exerting member on said compactor positioned between said rotatable supports for forcible extension into said excavation for compacting materials that are deposited in said excavation with the exerted force being of sufficient potential magnitude to cause elevation of said compactor component above its supporting ground, and a ballast element on said compactor component for changing the total weight thereof to change the soil compaction characteristics obtainable through use of said apparatus.

6. Structure as set forth in claim 5 and further comprising means for discharging trash materials into said excavation to be compacted by said force exerting member.

7. Structure as set forth in claim 5 and further comprising water supply elements whereby water may be discharged into said excavation to change the compaction characteristics for deposited materials.

8. Structure as set forth in claim 7 wherein said ballast element comprises a water tank whereby the ballast weight may be selectively changed.

9. Structure as set forth in claim 5 and further comprising trash receiving and dumping elements on said compactor adapted to receive and dump trash materials into said excavation to be compacted by said force exerting member.

10. Structure as set forth in claim 5 and further comprising a trash conveyor disposed for movement cooperatively with said compactor component for delivering trash materials to said compactor component.

11. Structure as set forth in claim 5 and further comprising conveyor components for elevating soil removed from said excavation to an elevation above the initial ground level whereby said soil may be used as a cover for deposited and compacted trash materials.

12. Structure as set forth in claim 11 and further comprising means for intermixing a portion of the removed and elevated soil with trash materials being deposited in the excavation to improve the compaction characteristics thereof.

References Cited

UNITED STATES PATENTS

| | | | |
|---|---|---|---|
| 1,935,090 | 11/1933 | Holland | 61—35 |
| 3,331,209 | 7/1967 | Sensibar et al. | 61—63 X |
| 3,446,026 | 5/1969 | Fikse | 61—35 |

DAVID J. WILLIAMOWSKY, Primary Examiner

P. C. KANNAN, Assistant Examiner

U.S. Cl. X.R.

111—1